US008280589B2

(12) United States Patent
Iwasaki

(10) Patent No.: US 8,280,589 B2
(45) Date of Patent: Oct. 2, 2012

(54) STEERING APPARATUS

(75) Inventor: Takashi Iwasaki, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 223 days.

(21) Appl. No.: 12/674,452

(22) PCT Filed: Aug. 29, 2008

(86) PCT No.: PCT/JP2008/066024
§ 371 (c)(1),
(2), (4) Date: Feb. 22, 2010

(87) PCT Pub. No.: WO2009/028735
PCT Pub. Date: Mar. 5, 2009

(65) Prior Publication Data
US 2011/0264326 A1  Oct. 27, 2011

(30) Foreign Application Priority Data
Aug. 30, 2007  (JP) ................. 2007-223652

(51) Int. Cl.
A01B 69/00 (2006.01)
H02P 1/00 (2006.01)
B62D 5/04 (2006.01)
(52) U.S. Cl. .................. 701/41; 318/440; 180/443
(58) Field of Classification Search ............. 701/41; 318/440; 180/443
See application file for complete search history.

(56) References Cited

U.S. PATENT DOCUMENTS 5,565,807 A * 10/1996 Ward .................. 327/205
5,570,002 A * 10/1996 Castleman ............ 323/283
5,657,257 A *  8/1997 Lee .................... 713/321
6,204,701 B1 *  3/2001 Tsay et al. ............ 327/143
(Continued)

FOREIGN PATENT DOCUMENTS
DE  199 21 451 C1  11/2000
(Continued)

OTHER PUBLICATIONS

Japanese Office Action issued Jul. 19, 2011, in Patent Application No. 2007-223652 (with partial English-language translation).

(Continued)

Primary Examiner — James Trammell
Assistant Examiner — Majdi Alsomiri
(74) Attorney, Agent, or Firm — Oblon, Spivak, McClelland, Maier & Neustadt, L.L.P.

(57) ABSTRACT

A secondary-control-system power supply line is provided to supply electricity from a secondary power supply apparatus to an electronic control apparatus. When a primary power supply voltage becomes equal to or lower than a primary power supply determination voltage, a power supply control section turns a step-down switching element on and off to thereby supply electricity from the secondary power supply apparatus to the electronic control apparatus. When a secondary power supply voltage becomes equal to or lower than a secondary power supply determination voltage, the power supply control section turns a secondary power supply relay off so as to stop the supply of electric power from the secondary power supply apparatus to a motor drive circuit, and continues the supply of electric power to the electronic control apparatus. Thus, resetting of a microcomputer of the electronic control apparatus, which would otherwise occur due to a drop in the power supply voltage, is prevented.

12 Claims, 5 Drawing Sheets

U.S. PATENT DOCUMENTS

| | | | |
|---|---|---|---|
| 7,248,009 B1 * | 7/2007 | Sundquist | 318/434 |
| 7,537,082 B2 * | 5/2009 | Fujiyama | 180/446 |
| 7,837,004 B2 * | 11/2010 | Yasuda | 180/446 |
| 7,845,459 B2 * | 12/2010 | Kasai | 180/443 |
| 7,863,845 B2 * | 1/2011 | Kasai et al. | 318/440 |
| 2004/0222035 A1 | 11/2004 | Yoneda et al. | |
| 2006/0184298 A1 * | 8/2006 | Matsuoka | 701/41 |
| 2008/0177444 A1 * | 7/2008 | Tachibana et al. | 701/41 |
| 2010/0121530 A1 * | 5/2010 | Suzuki et al. | 701/41 |

FOREIGN PATENT DOCUMENTS

| | | |
|---|---|---|
| EP | 1 900 602 A1 | 3/2008 |
| EP | 1 958 851 A1 | 8/2008 |
| JP | 1 94066 | 4/1989 |
| JP | 2004-17732 | 1/2004 |
| JP | 2004 291852 | 10/2004 |
| JP | 2004 330877 | 11/2004 |
| JP | 2006-205894 | 8/2006 |
| JP | 2006 213273 | 8/2006 |
| JP | 2007 1324 | 1/2007 |
| JP | 2007 15474 | 1/2007 |
| JP | 2007 91122 | 4/2007 |
| JP | 2007 153107 | 6/2007 |
| WO | WO 2007/141634 A1 | 12/2007 |

OTHER PUBLICATIONS

German Office Action issued Jan. 10, 2011, in Patent Application No. 11 2008 002 240.2-21 with English Translation.

* cited by examiner

STEERING APPARATUS

TECHNICAL FIELD

The present invention relates to a steering apparatus which is designed to supply electric power to an electric actuator from both a primary power supply apparatus and a secondary power supply apparatus to thereby generate a steering force.

BACKGROUND ART

Conventionally, for example, an electric power steering apparatus includes an electric motor for imparting a steering assist torque to a rotating operation of a steering wheel, and generates a proper steering assist torque through control of electricity supply to the electric motor. The steering assist torque is set such that the greater the steering torque input to the steering wheel by a driver and the lower the vehicle speed, the greater the steering assist torque. The electric power steering apparatus uses an onboard battery as a power source for performing such steering assist control.

However, at the time of stationary swing or the like, sole use of the onboard battery may fail to provide sufficient electric power. In view of such a problem, an apparatus proposed in Japanese Patent Application Laid-Open (kokai) No. 2007-91122 includes a secondary power supply apparatus for supplementing the onboard battery. The secondary power supply apparatus is connected in parallel with a power supply line extending from the onboard battery (hereinafter referred to as the "primary power supply apparatus") to a motor drive circuit.

In this proposed electric power steering apparatus, electric power for driving the motor is withdrawn from the primary power supply apparatus. However, when sole use of the power supply of the primary power supply apparatus fails to provide sufficient electric power (e.g., at the time of stationary swing), electric power is withdrawn from the secondary power supply apparatus so as to make up for the shortfall. Further, when power consumption is small (e.g., at the time of straight traveling), electric power from the primary power supply apparatus is charged into the secondary power supply apparatus.

DISCLOSURE OF THE INVENTION

However, in the case where the primary power supply apparatus has deteriorated, even when the secondary power supply apparatus supplements the supply of electric power, electric power may become short in some cases. In such a case, the power supply voltages of the primary power supply apparatus and the secondary power supply apparatus drop, causing the following problem.

The electric power steering apparatus includes an electronic control apparatus which is mainly formed of a microcomputer and is adapted to drive and control the electric motor. This electronic control apparatus receives electric power from the primary power supply apparatus. Therefore, when the power supply voltage of the primary power supply apparatus drops and falls below the lowest operation voltage of the microcomputer, the microcomputer is reset. When the microcomputer is reset, steering assist control is suddenly stopped. Further, even when the power supply voltage is recovered, the steering assist control cannot be re-started immediately because of performance of initial diagnosis, etc.

The present invention has been accomplished so as to solve the above-described problem, and its object is to prevent resetting of the microcomputer of the electronic control apparatus even when the primary power supply apparatus has deteriorated.

In order to achieve the above-described object, the present invention provides a steering apparatus comprising a primary power supply apparatus; a secondary power supply apparatus charged by the primary power supply apparatus; an electric actuator which generates a steering force for steering wheels; a drive circuit which receives electric power from a drive system power supply circuit formed by connecting the primary power supply apparatus and the secondary power supply apparatus in parallel and which drives the electric actuator; and an electronic control apparatus which receives electric power from a control system power supply circuit connected to the primary power supply apparatus and which outputs a control signal to the drive circuit so as to control operation of the electric actuator. The steering apparatus is characterized by comprising a secondary control system power supply circuit which is connected to the secondary power supply apparatus and the electronic control apparatus and supplies electric power from the secondary power supply apparatus to the electronic control apparatus.

In the present embodiment, electric power is supplied to the drive circuit of the electric actuator from the drive system power supply circuit formed by connecting the primary power supply apparatus and the secondary power supply apparatus in parallel. That is, electric power can be supplied to the drive circuit of the electric actuator from both the primary power supply apparatus and the secondary power supply apparatus. The electronic control apparatus outputs a control signal to the drive circuit so as to control the operation of the electric actuator, and generates a steering force for steering the wheels through the operation of the electric actuator. For example, the electronic control apparatus includes steering operation detection means for detecting a driver's steering operation, and outputs the drive signal to the drive circuit in accordance with the detected steering operation. In this case, the steering force may be generated by means of imparting an axial force to a rod for steering the wheels or imparting a steering force to a steering shaft connected to the steering wheel.

The control system power supply circuit, which receives electric power from the primary power supply apparatus, and the secondary control system power supply circuit, which receives electric power from the secondary power supply apparatus, are connected to the electronic control apparatus. Therefore, even when the power supply capacity of the primary power supply apparatus has dropped and the primary power supply voltage has dropped, the electronic control apparatus can receive electric power from the secondary power supply apparatus. As a result, the present invention can suppress occurrence of a trouble; specifically, resetting of a microcomputer, which resetting would otherwise occur when the power supply voltage supplied to the electronic control apparatus falls below the lowest operation voltage of the electronic control apparatus (the lowest value of a range of power supply voltage in which proper operation is guaranteed).

Notably, an on-board power supply which supplies electric power not only to the steering apparatus of a vehicle but also to other electrical loads may be used as the primary power supply apparatus.

Another feature of the present invention is provision of power-supply-capacity-drop detection means for detecting a drop in the power supply capacity of the primary power supply apparatus and a drop in the power supply capacity of the secondary power supply apparatus; and power supply control means, operable when both a drop in the power supply capacity of the primary power supply apparatus and a drop in the power supply capacity of the secondary power supply apparatus are detected, for giving priority to the supply of electric power from the secondary power supply apparatus to the electronic control apparatus over the supply of electric power from the secondary power supply apparatus to the drive circuit.

In the case where the supply of electric power from the secondary power supply apparatus to the drive circuit is continued in a state where the power supply capacity of the primary power supply apparatus has dropped, if the power supply capacity of the secondary power supply apparatus drops, the secondary power supply apparatus also may become unable to properly supply electric power to the electronic control apparatus. In order to overcome such a drawback, in the present invention, when the power-supply-capacity-drop detection means detects both a drop in the power supply capacity of the primary power supply apparatus and a drop in the power supply capacity of the secondary power supply apparatus, the power supply control means gives priority to the supply of electric power from the secondary power supply apparatus to the electronic control apparatus over the supply of electric power from the secondary power supply apparatus to the drive circuit. As a result, proper supply of electric power from the secondary power supply apparatus to the electronic control apparatus can be maintained, whereby a fault of the electronic control apparatus (resetting of the microcomputer) can be prevented.

Another feature of the present invention resides in that, when both a drop in the power supply capacity of the primary power supply apparatus and a drop in the power supply capacity of the secondary power supply apparatus are detected, the power supply control means prohibits the supply of electric power from the secondary power supply apparatus to the drive circuit, to thereby give priority to the supply of electric power from the secondary power supply apparatus to the electronic control apparatus.

In this invention, when both a drop in the power supply capacity of the primary power supply apparatus and a drop in the power supply capacity of the secondary power supply apparatus are detected, the supply of electric power from the secondary power supply apparatus to the drive circuit is prohibited. Accordingly, electric power stored in the secondary power supply apparatus is not consumed for driving of the electric actuator, so that the supply of electric power to the electronic control apparatus can be performed reliably.

Another feature of the present invention resides in that the power supply control means prohibits the supply of electric power from the secondary power supply apparatus to the drive circuit by cutting off a power supply circuit for supplying electric power from the secondary power supply apparatus to the drive circuit.

This invention can reliably prohibit the supply of electric power from the secondary power supply apparatus to the drive circuit.

Another feature of the present invention resides in that the power-supply-capacity-drop detection means includes primary-power-supply-voltage detection means for detecting the power supply voltage of the primary power supply apparatus and secondary-power-supply-voltage detection means for detecting the power supply voltage of the secondary power supply apparatus, wherein the power-supply-capacity-drop detection means estimates that both the power supply capacities of the primary power supply apparatus and the secondary power supply apparatus have dropped, when the power supply voltage of the primary power supply apparatus becomes equal to or lower than a primary power supply determination voltage and the power supply voltage of the secondary power supply apparatus becomes equal to or lower than a secondary power supply determination voltage.

In this invention, since the power supply capacities are estimated on the basis of the power supply voltages of the primary power supply apparatus and the secondary power supply apparatus, drops in the power supply capacities can be detected simply. Further, since the fault of the electronic control apparatus (resetting of the microcomputer) occurs due to a drop in the supplied power supply voltage, the fault of the electronic control apparatus can be prevented reliably through direct detection of the voltage.

Another feature of the present invention is provision of a step-up circuit which steps up an output voltage of the primary power supply apparatus, wherein the drive circuit is connected to the output side of the step-up circuit, and the secondary power supply apparatus is connected in parallel to a line between the step-up circuit and the drive circuit.

In this invention, the output voltage of the primary power supply apparatus is supplied to the drive circuit after being stepped up by the step-up circuit. The secondary power supply apparatus is connected to the output side of the step-up circuit, and functions as a power supply apparatus into which electric power from the primary power supply apparatus is charged and which supplies the charged electric power to the drive circuit. Accordingly, efficient drive of the electric actuator is possible. That is, the output voltages of the primary power supply apparatus and the secondary power supply apparatus can be set to a proper voltage for efficiently operating the electric actuator.

Another feature of the present invention resides in that a step-down circuit which steps down the power supply voltage of the secondary power supply apparatus is provided in the secondary control system power supply circuit which supplies electric power from the secondary power supply apparatus to the electronic control apparatus.

In this invention, because of the step-up operation of the step-up circuit, the power supply voltage of the secondary power supply apparatus is higher than that of the primary power supply apparatus. Accordingly, the power supply voltage of the secondary power supply apparatus is supplied to the electronic control apparatus after being stepped down by the step-down circuit, whereby proper electric power supply can be performed.

BEST MODE FOR CARRYING OUT THE INVENTION

Figure 1:
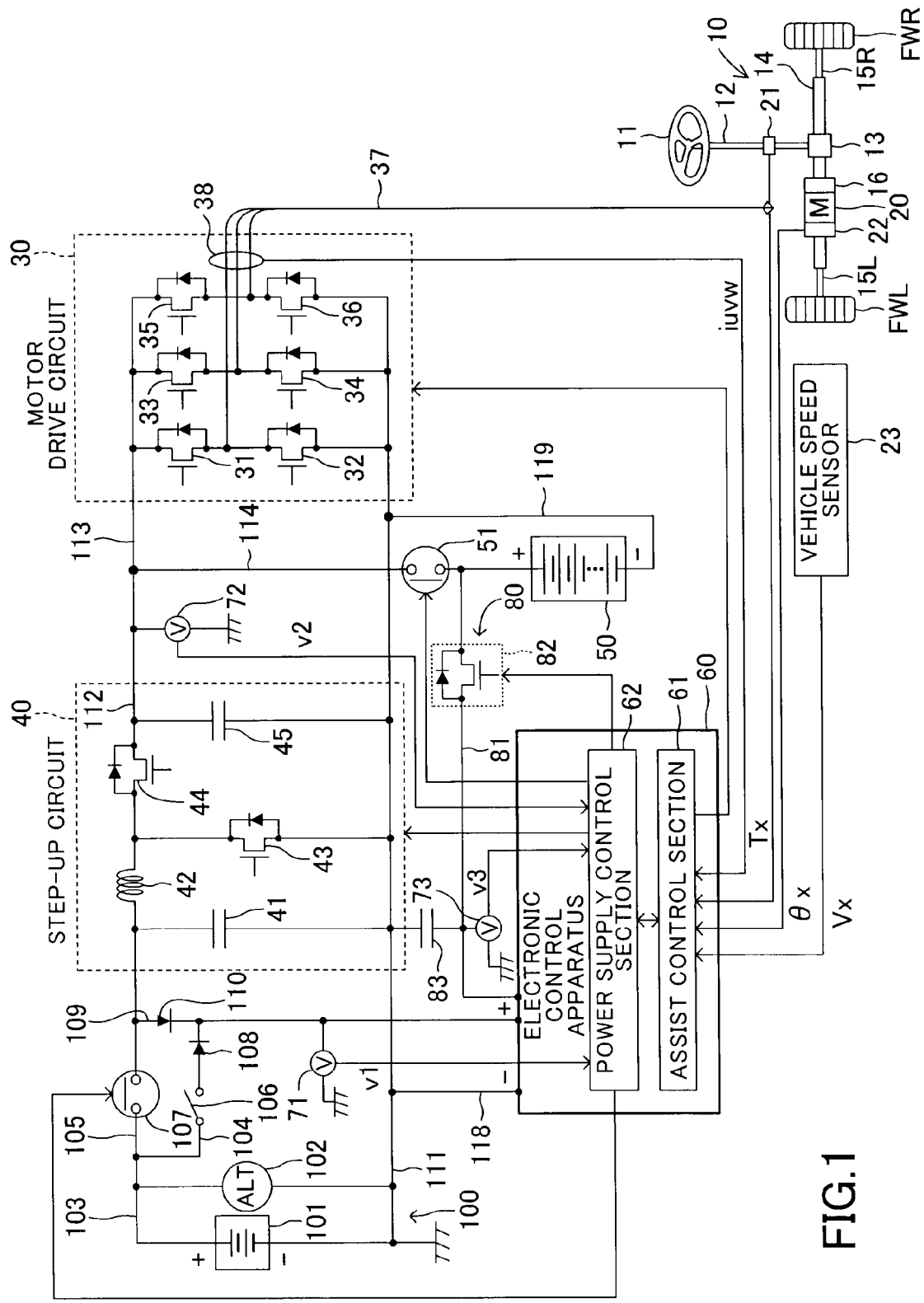
FIG. 1 is a schematic diagram of an electric power steering apparatus according to an embodiment of the present invention.

One embodiment of a steering apparatus of the invention will now be described with reference to the drawings. FIG. 1 schematically shows the configuration of an electric power steering apparatus for a vehicle according to the embodiment.

The electric power steering apparatus for a vehicle according to the embodiment is mainly composed of a steering mechanism 10 which steers steerable wheels in accordance with steering operation of a steering wheel 11; an electric motor 20 incorporated in the steering mechanism 10 and adapted to generate steering assist torque; a motor drive circuit 30 for driving the electric motor 20; a step-up circuit 40 which steps up an output voltage of a primary power supply apparatus 100 and supply a stepped-up voltage to the motor drive circuit 30; a secondary power supply apparatus 50 connected in parallel with a power supply circuit extending between the step-up circuit 40 and the motor drive circuit 30; and an electronic control apparatus 60 which controls operation of the electric motor 20 and the power supply state within the electric power steering apparatus.

The steering mechanism 10, which steers left and right front wheels FWL and FWR in response to a rotation operation of the steering wheel 11, includes a steering shaft 12 whose upper end is connected to the steering wheel 11 for integral rotation therewith. A pinion gear 13 is connected to the lower end of the shaft 12 for integral rotation therewith. The pinion gear 13 is in meshing engagement with rack teeth formed on a rack bar 14, and constitutes a rack and pinion mechanism in cooperation with the rack bar 14. Knuckles (not shown) of the left and right front wheels FWL and FWR are steerably connected to opposite ends of the rack bar 14 via tie rods 15L and 15R. The left and right front wheels FWL and FWR are steered leftward or rightward in accordance with an axial displacement of the rack bar 14 resulting from rotation of the steering shaft 12 about its axis.

The electric motor 20 for steering assist is assembled to the rack bar 14. A rotary shaft of the electric motor 20 is connected to the rack bar 14 via a ball-screw mechanism 16 in a power transmissible manner. As a result of rotation of the rotary shaft of the electric motor 20, a steering force is applied to the left and right front wheels FWL and FWR so as to assist the steering operation. The ball-screw mechanism 16 serves as a speed reducer and a rotation-rectilinear motion converter. The ball-screw mechanism 16 reduces the rotational speed of the electric motor 20, converts rotation of the electric motor 20 to a rectilinear motion, and transmits the rectilinear motion to the rack bar 14.

A steering torque sensor 21 is provided on the steering shaft 12. The steering torque sensor 21 outputs a signal corresponding to a steering torque which acts on the steering shaft 12 as a result of the steering wheel 11 being rotated. Hereinafter, the value of steering torque detected on the basis of the signal output from the steering torque sensor 21 will be referred to as "steering torque Tx." The direction in which the steering wheel 11 is rotated is determined on the basis of the polarity of the steering torque Tx; i.e., whether the steering torque Tx is positive or negative.

A rotational angle sensor 22 is provided for the electric motor 20. This rotational angle sensor 22 is incorporated into the electric motor 20, and outputs a detection signal corresponding to the rotational angle position of the rotor of the electric motor 20. The detection signal output from the rotational angle sensor 22 is used for calculation of rotational angle and rotational angular velocity of the electric motor 20. Meanwhile, since the rotational angle of the electric motor 20 is in proportion to the steering angle of the steering wheel 11, the rotational angle of the electric motor 20 is also used as the steering angle of the steering wheel 11. Further, since a rotational angular velocity, which is obtained by differentiating the rotational angle of the electric motor 20 with respect to time, is in proportion to the steering angular velocity of the steering wheel 11, the rotational angular velocity of the electric motor 20 is also used as the steering speed of the steering wheel 11. Hereinbelow, a value of steering angle of the steering wheel 11 detected on the basis of the output signal from the rotational angle sensor 22 will be referred to as "steering angle $\theta x$," and a value of steering angular velocity obtained by differentiating the steering angle $\theta x$ with respect to time will be referred to as "steering speed $\omega x$. Positive and negative values of the steering angle $\theta x$ represent clockwise and counterclockwise steering angles, respectively, of the steering wheel 11 in relation to its neutral position.

The motor drive circuit 30 is a three-phase inverter circuit formed by six switching elements (MOSFETs) 31 to 36. Specifically, a circuit including serially connected first and second switching elements 31 and 32, a circuit including serially connected third and fourth switching elements 33 and 34, and a circuit including serially connected fifth and sixth switching elements 35 and 36 are connected in parallel. Power supply lines 37 for supplying electric power to the electric motor 20 are connected to nodes between the upper and lower switching elements (31 and 32, 33 and 34, and 35 and 36) of the respective serial circuits.

The drains of the first switching element 31, the third switching element 33, and the fifth switching element 35 are connected to a motor drive line 113 to be described later; and the sources of the second switching element 32, the fourth switching element 34, and the sixth switching element 36 are connected to a ground line 111. A current sensor 38 is provided on a power supply line 37 extending from the motor drive circuit 30 to the electric motor 20. This current sensor 38 detects (measures) phase currents, and outputs to the electronic control apparatus 60 a detection signal corresponding to the detected currents. Hereinafter, the detected currents will be referred to as the "motor current iuvw". Further this current sensor 38 will be referred to as the "motor current sensor 38".

The gates of the switching elements 31 to 36 are connected to an assist control section 61 (which will be described later) of the electronic control apparatus 60, and the duty ratios of the switching elements 31 to 36 are controlled in accordance with PWM control signals from the assist control section 61. Thus, voltages for driving the electric motor 20 are adjusted to a target voltage. Notably, as indicated by circuit symbols in FIG. 1, MOSFETs which constitute the switching elements 31 to 36 have parasitic diodes.

Next, a power supply system of the electric power steering apparatus will be described.

The electric power steering apparatus receives electric power from the primary power supply apparatus 100. The primary power supply apparatus 100 is composed of a main battery 101 and an alternator 102 connected in parallel with each other. The alternator 102 is rotated by an engine, whereby the alternator 102 generates electricity. An ordinary car battery whose rated output voltage is 12 V is used as the main battery 101.

This primary power supply apparatus 100 supplies electric power not only to the electric power steering apparatus but also to other electrical loads mounted on the vehicle. A power supply source line 103 connected to the power supply terminal (+terminal) of the main battery 101 branches into a primary-control-system power supply line 104 and a drive-system power supply line 105. The primary-control-system power supply line 104 functions as a power supply line for supplying electric power to only the electronic control apparatus 60. The drive-system power supply line 105 functions as a power supply line for supplying electric power to both the motor drive circuit 30 and the electronic control apparatus 60.

An ignition switch 106 is provided in the primary-control-system power supply line 104. A primary power supply relay 107 is provided in the drive-system power supply line 105. The primary power supply relay 107 operates as follows. In response to an ON signal from a power supply control section 62 (which will be described later) of the electronic control apparatus 60, the primary power supply relay 107 closes its contact so as to allow the supply of electric power from the primary power supply apparatus 100 to the electric motor 20. In response to an OFF signal from the power supply control section 62, the primary power supply relay 107 opens its contact so as to prohibit the supply of electric power from the primary power supply apparatus 100 to the electric motor 20. The primary-control-system power supply line 104 is connected to a power supply+terminal of the electronic control apparatus 60, and includes a diode 108 provided on the load side (the electronic control apparatus 60 side) of the ignition switch 106. This diode 108 is provided in such an orientation that its cathode is connected to the electronic control apparatus 60 and its anode is connected to the primary power supply apparatus 100 via the ignition switch 106. The diode 108 serves as a reverse flow prevention element which allows a flow of electricity only in the power supply direction.

A connection line 109 branches off from the drive-system power supply line 105 at a point on the load side of the primary power supply relay 107, and is connected to the primary-control-system power supply line 104. This connection line 109 is connected to the primary-control-system power supply line 104 at a point between the diode 108 and the electronic control apparatus 60. Further, a diode 110 is provided in the connection line 109. This diode 110 is provided in such an orientation that its cathode is connected to the primary-control-system power supply line 104 and its anode is connected to the drive-system power supply line 105. Accordingly, although electric power can be supplied from the drive-system power supply line 105 to the primary-control-system power supply line 104 via the connection line 109, electric power cannot be supplied from the primary-control-system power supply line 104 to the drive-system power supply line 105. The drive-system power supply line 105 and the ground line 111 are connected to the step-up circuit 40. Further, the ground line 111 is connected to the ground terminal of the electronic control apparatus 60 via a control system ground line 118. Accordingly, the primary-control-system power supply line 104 and the control system ground line 118 form a power supply circuit for supplying electric power to the electronic control apparatus 60 (corresponding to the control system power supply circuit).

A first voltage sensor 71 is connected to the primary-control-system power supply line 104 so as to detect the power supply voltage of the primary power supply apparatus 100. This first voltage sensor 71 is connected to the power supply control section 62 of the electronic control apparatus 60, and outputs to the power supply control section 62 a signal representing a voltage v1, which is a measured value. Hereinafter, this voltage v1 will be referred to as the "primary power supply voltage v1."

The step-up circuit 40 is composed of a capacitor 41 provided between the drive-system power supply line 105 and the ground line 111; a step-up coil 42 provided in series in the drive-system power supply line 105 to be located on the load side with respect to the connection point of the capacitor 41; a first step-up switching element 43 provided between the ground line 111 and a node on the drive-system power supply line 105 located on the load side with respect to the step-up coil 42; a second step-up switching element 44 provided in series in a portion of the drive-system power supply line 105 located on the load side with respect to the connection point of the first step-up switching element 43; and a capacitor 45 provided between the ground line 111 and a node on the drive-system power supply line 105 located on the load side with respect to the second step-up switching element 44. A step-up power supply line 112 is connected to the secondary side of the step-up circuit 40.

In the present embodiment, MOSFETs are used for the step-up switching elements 43 and 44. However, other switching elements may be used. Further, as indicated by circuit symbols in FIG. 1, MOSFETs which constitute the step-up switching elements 43 and 44 have parasitic diodes.

The power supply control section 62 of the electronic control apparatus 60 controls the step-up operation of the step-up circuit 40. The power supply control section 62 outputs pulses having a predetermined period to the gates of the first and second step-up switching elements 43 and 44 to thereby turn the step-up switching elements 43 and 44 on and off. Thus, the step-up circuit 40 steps up the voltage supplied from the primary power supply apparatus 100, and generates a predetermined output voltage to the step-up power supply line 112. In this case, the first and second step-up switching elements 43 and 44 are controlled in such a manner that when the first element is on the second element is off and when the first element is off the second element is on. The step-up circuit 40 operates as follows. First, the first step-up switching element 43 is turned on and the second step-up switching element 44 is turned off so as to cause current to flow through the step-up coil 42 for a short period of time, to thereby accumulate electric power in the step-up coil 42. Immediately after that, the first step-up switching element 43 is turned off and the second step-up switching element 44 is turned on, whereby the electric power accumulated in the step-up coil 42 is output.

The output voltage of the second step-up switching element 44 is smoothed by the capacitor 45. Accordingly, a stable stepped-up voltage is output from the step-up power supply line 112. In this case, a plurality of capacitors which differ in frequency characteristic may be connected in parallel so as to improve the smoothing performance. Further, the capacitor 41 provided on the input side of the step-up circuit 40 removes noise transmitted to the primary power supply apparatus 100.

The output voltage (stepped-up voltage) of the step-up circuit 40 can be adjusted through control of the duty ratios of the first and second step-up switching elements 43 and 44. The greater the on-duty ratio of the second step-up switching element 44, the higher the stepped-up voltage. The step-up circuit 40 of the present embodiment is configured to enable the stepped-up voltage to be adjusted within a range of, for example, 20 V to 50 V. Notably, a general purpose DC-DC converter may be used as the step-up circuit 40.

A second voltage sensor 72 is connected to the step-up power supply line 112 located on the output side of the step-up circuit 40. This second voltage sensor 72 is connected to the power supply control section 62 of the electronic control apparatus 60, and outputs to the power supply control section 62 a signal representing a voltage v2, which is a measured value. Usually, this second voltage sensor 72 detects the stepped-up voltage output from the step-up circuit 40. However, when the step-up operation of the step-up circuit 40 is stopped or the primary power supply relay 107 is turned off, the second voltage sensor 72 detects the power supply voltage of the secondary power supply apparatus 50. Hereinafter, the voltage v2 detected by the second voltage sensor 72 will be referred to as the "stepped-up voltage v2" or the "secondary power supply voltage v2," depending on the detection state.

The step-up power supply line 112 branches into a motor drive line 113 and a charge/discharge line 114. The motor drive line 113 and the ground line 111 are connected to a power supply input section of the motor drive circuit 30. The charge/discharge line 114 is connected to a power supply+ terminal of the secondary power supply apparatus 50.

The secondary power supply apparatus 50 is a high-voltage storage apparatus into which electric power output from the step-up circuit 40 is charged and which supplies electric power to the motor drive circuit 30 so as to assist the primary power supply apparatus 100 when the motor drive circuit 30 requires a large amount of electric power. The secondary power supply apparatus 50 is configured by serially connecting a plurality of electricity storage cells such that the secondary power supply apparatus 50 can maintain a voltage corresponding to the output voltage of the step-up circuit 40. The ground terminal of the secondary power supply apparatus 50 is connected to the ground line 111 via a secondary ground line 119.

Accordingly, the primary power supply apparatus 100 and the secondary power supply apparatus 50 are connected in parallel, whereby a motor-drive-system power supply circuit for supplying electric power to the motor drive circuit 30 is formed.

A secondary power supply relay 51 is serially connected to the charge/discharge line 114. The secondary power supply relay 51 operates as follows. In response to an ON signal from the electronic control apparatus 60, the secondary power supply relay 51 closes its contact so as to form a charge/discharge circuit for the secondary power supply apparatus 50. In response to an OFF signal from the electronic control apparatus 60, the secondary power supply relay 51 opens its contact so as to cut off the charge/discharge circuit for the secondary power supply apparatus 50.

A secondary-control-system power supply line 81 branches off from the charge/discharge line 114 at a point between the secondary power supply relay 51 and the secondary power supply apparatus 50. This secondary-control-system power supply line 81 is connected to another power supply+terminal of the electronic control apparatus 60. The electronic control apparatus 60 has two power supply+terminals, and can receive electric power from either of the two power supply+terminals. One of the power supply+terminals is connected to the primary-control-system power supply line 104, and the other power supply+terminal is connected to the secondary-control-system power supply line 81.

A step-down circuit 80 is provided in the secondary-control-system power supply line 81. The step-down circuit 80 is composed of a step-down switching element 82 and a smoothing capacitor 83. For example, a MOSFET is used for the step-down switching element 82. The power supply control section 62 of the electronic control apparatus 60 outputs a pulse signal having a predetermined period to the gate of the step-down switching element 82 to thereby turn the step-down switching element 82 on and off, whereby the power supply voltage of the secondary power supply apparatus 50 is stepped down. The smoothing capacitor 83 is provided between the secondary side (the stepped-down side) of the step-down switching element 82 and the ground line 111, and smoothes the voltage on the secondary side of the step-down switching element 82. Thus, a proper voltage obtained through the step-down operation is supplied from the step-down circuit 80 to the electronic control apparatus 60.

Accordingly, the secondary-control-system power supply line 81, which includes the step-down circuit 80, and the control system ground line 118 form another power supply circuit for supplying electric power to the electronic control apparatus 60 (corresponding to the secondary control system power supply circuit of the present invention).

A third voltage sensor 73 is connected to the secondary-control-system power supply line 81 located on the output side of the step-down circuit 80. This third voltage sensor 73 is connected to the power supply control section 62 of the electronic control apparatus 60, and outputs to the power supply control section 62 a signal representing a voltage v3, which is a measured value. Hereinafter, the voltage v3 measured by the third voltage sensor 73 will be referred to as the "secondary control voltage v3."

The electronic control apparatus 60 is mainly formed of a microcomputer including a CPU, ROM, RAM, etc., and is functionally divided into an assist control section 61 and the power supply control section 62. The assist control section 61 and the power supply control section 62 are designed in such a manner that they can exchange control instructions, control data, etc. therebetween. The steering torque sensor 21, the rotational angle sensor 22, the motor current sensor 38, and the vehicle speed sensor 23 are connected to the assist control section 61, so that the assist control section 61 can receive sensor signals representing the steering torque Tx, the steering angle θx, the motor current iuvw, and the vehicle speed Vx, respectively. On the basis of these sensor signals, the assist control section 61 outputs a PWM control signal to the motor drive circuit 30 so as to drive and control the electric motor 20, to thereby assist the driver's steering operation.

The first voltage sensor 71, the second voltage sensor 72, the third voltage sensor 73, the step-up circuit 40, the primary power supply relay 107, the secondary power supply relay 51, and the step-down switching element 82 are connected to the power supply control section 62. On the basis of the stepped-up voltage v2 detected by the second voltage sensor 72, the power supply control section 62 outputs a PWM control signal to the step-up circuit 40 such that a target stepped-up voltage can be obtained. The step-up circuit 40 controls the duty ratios of the first and second step-up switching elements 43 and 44 in accordance with the input PWM control signal. Thus, the stepped-up voltage, which is the output voltage of the step-up circuit 40, is controlled to the target stepped-up voltage.

Further, the power supply control section 62 controls the power supply state within the electric power steering apparatus on the basis of the electric power supply capacities of the primary power supply apparatus 100 and the secondary power supply apparatus 50. This power supply state control will be described later.

Figure 2:
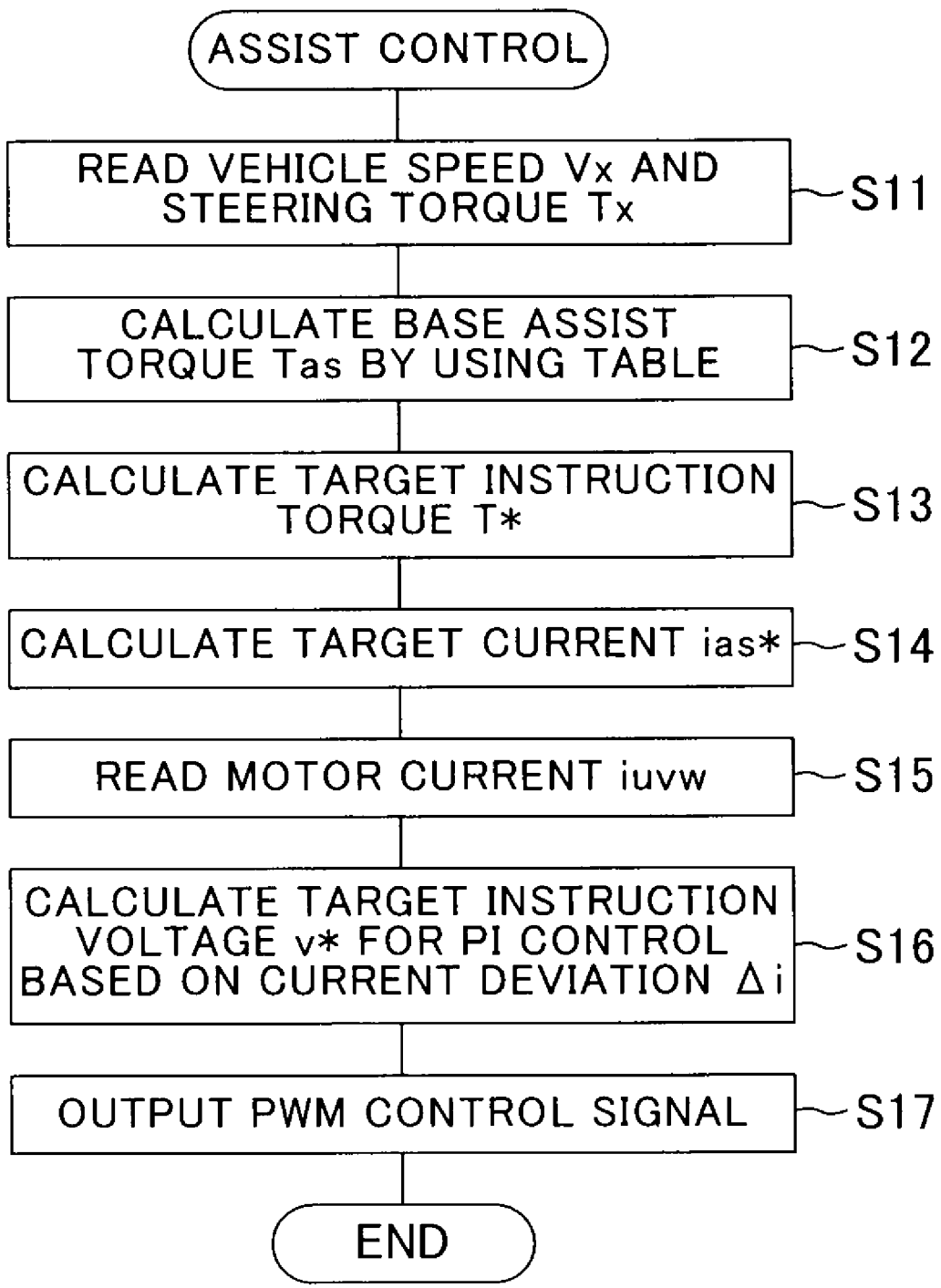
FIG. 2 is a flowchart showing a steering assist control routine.

Next, steering assist control processing performed by the assist control section 61 of the electronic control apparatus 60 will be described. FIG. 2 shows a steering assist control routine which is stored in the ROM of the electronic control apparatus 60 as a control program and executed by the assist control section 61. The steering assist control routine is started when the ignition switch 106 is turned on, and is repeatedly executed at predetermined short intervals.

When the present control routine is started, in step S11, the assist control section 61 first reads the vehicle speed Vx detected by the vehicle speed sensor 23 and the steering torque Tx detected by the steering torque sensor 21.

Figure 3:
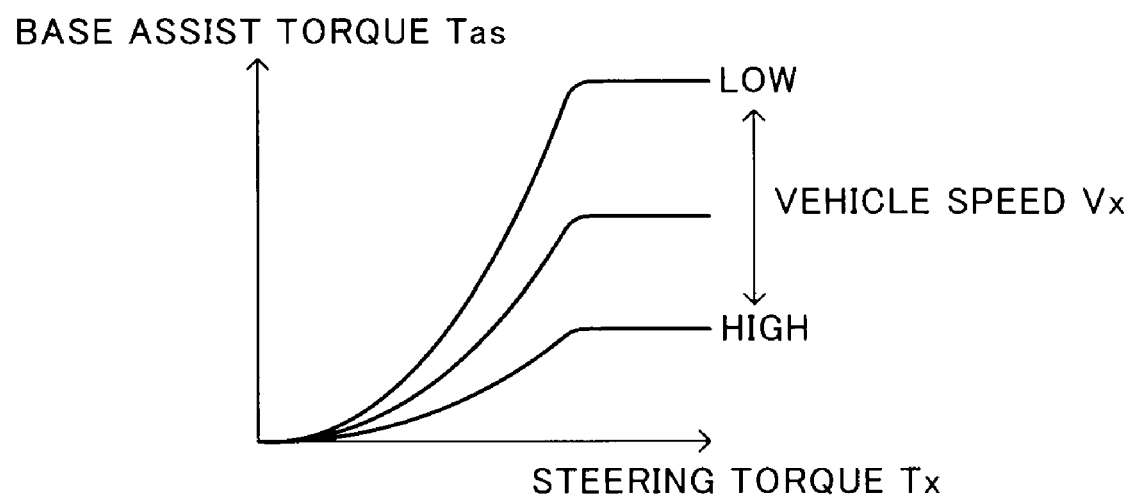
FIG. 3 is a graph representing an assist torque table.

Subsequently, in step S12, with reference to an assist torque table shown in FIG. 3, the assist control section 61 calculates a base assist torque Tas set in accordance with the input vehicle speed Vx and steering torque Tx. The assist torque table is stored in the ROM of the electronic control apparatus 60, and is set such that the base assist torque Tas increases as the steering torque Tx increases, and the lower the vehicle speed Vx, the greater the value of the base assist torque Tas. The assist torque table of FIG. 3 shows only changes in the base assist torque Tas with the steering torque Tx in the clockwise direction. However, changes in the base assist torque Tas with the steering torque Tx in the counterclockwise direction are identical with those shown in FIG. 3. Although the directions (polarities) of the steering torque Tx and the base assist torque Tas are opposite, the absolute values of the base assist torque Tas and the steering torque Tx are the same.

Subsequently, in step S13, the assist control section 61 calculates a target instruction torque T* by adding a compensation torque to the base assist torque Tas. This compensation torque is calculated as the sum of a return force with which the steering shaft 12 is returned to its base position and which increases in proportion to the steering angle θx and a return torque which corresponds to a resisting force against rotation of the steering shaft 12 and which increases in proportion to the steering speed ωx. The assist control section 61 performs this calculation while using the rotational angle of the electric motor 20 detected by the rotational angle sensor 22 (corresponding to the steering angular θx of the steering wheel 11). Further, the steering speed ωx is obtained by differentiating the steering angular θx of the steering wheel 11 with respect to time.

Next, in step S14, the assist control section 61 calculates a target current ias* which is proportional to the target instruction torque T*. The target current ias* is obtained by dividing the target instruction torque T* by a torque constant. However, if an upper limit is set for the target current by means of power supply control processing to be described later, the target current ias* is modified as follows. That is, when the target current ias* calculated from the target instruction torque T* is greater than an upper limit current iaslim, the target current ias* is changed to the upper limit current iaslim. Meanwhile, when the target current ias* calculated from the target instruction torque T* is not greater than the upper limit current iaslim, the target current ias* is not changed.

Subsequently, in step S15, the assist control section 61 reads the detection signal output from the motor current sensor 38 and representing the motor current iuvw flowing through the electric motor 20. Subsequently, in step S16, the assist control section 61 calculates a deviation Δi between the motor current iuvw and the previously calculated target current ias*, and calculate a target instruction voltage v* for PI control (proportional integral control) performed on the basis of the deviation Δi.

In step S17, the assist control section 61 outputs to the motor drive circuit 30 a PWM control voltage signal corresponding to the target instruction voltage v*, and ends the current execution of the present control routine. The present control routine is repeatedly executed at predetermined short intervals. Accordingly, through execution of the present control routine, the duty ratios of the switching elements 31 to 36 of the motor drive circuit 30 are controlled, whereby a desired assist torque corresponding to a steering operation of a driver is attained.

During execution of the steering assist control, in particular, when the steering wheel is operated during low-speed traveling or the steering wheel is operated at high speed, a large amount of electric power is needed. However, increasing the capacity of the primary power supply apparatus 100 for temporary large power consumption is not preferred. In view of this, in the electric power steering apparatus of the present embodiment, the capacity of the primary power supply apparatus 100 is not increased, and the secondary power supply apparatus 50 is provided in order to supplement the supply of electric power when a large amount of electric power is consumed temporarily. Further, the step-up circuit 40 is provided so as to efficiently drive the electric motor 20, and constitute a system for supplying the stepped-up voltage to the motor drive circuit 30 and the secondary power supply apparatus 50.

When such a power supply system is configured, the secondary power supply apparatus 50 can supplement the power supply of the primary power supply apparatus 100. However, when the power supply capacity of the primary power supply apparatus 100 drops, the capacity of the entire power supply system drops. As a result, every time the motor drive circuit 30 consumes a large amount of electric power, the power supply voltage of the primary power supply apparatus 100 drops. Since the main portion of the electronic control apparatus 60 is composed of a microcomputer, if the supplied power supply voltage falls below the lowest operation voltage, the microcomputer is reset.

In view of such a problem, in the present embodiment, there is provided a power supply circuit (the secondary-control-system power supply line 81 and the step-down circuit 80) for supplying electric power from the secondary power supply apparatus 50 to the electronic control apparatus 60 so as to prevent resetting of the microcomputer, which resetting would otherwise occur when the capacity of the primary power supply apparatus 100 has dropped. The secondary power supply apparatus 50 is provided from the beginning as a power source for motor drive. Accordingly, if the secondary power supply apparatus 50 is continuously used in a state where the capacity of the primary power supply apparatus 100 has dropped, the amount of electricity stored in the secondary power supply apparatus 50 decreases, and finally not only the supply of electric power to the motor drive circuit 30 but also the supply of electric power to the electronic control apparatus 60 may become difficult. In order to overcome such a drawback, in such a case, priority is given to the supply of electric power from the secondary power supply apparatus 50 to the electronic control apparatus 60, and the supply of electric power to the motor drive circuit 30 is prohibited.

Figure 4:
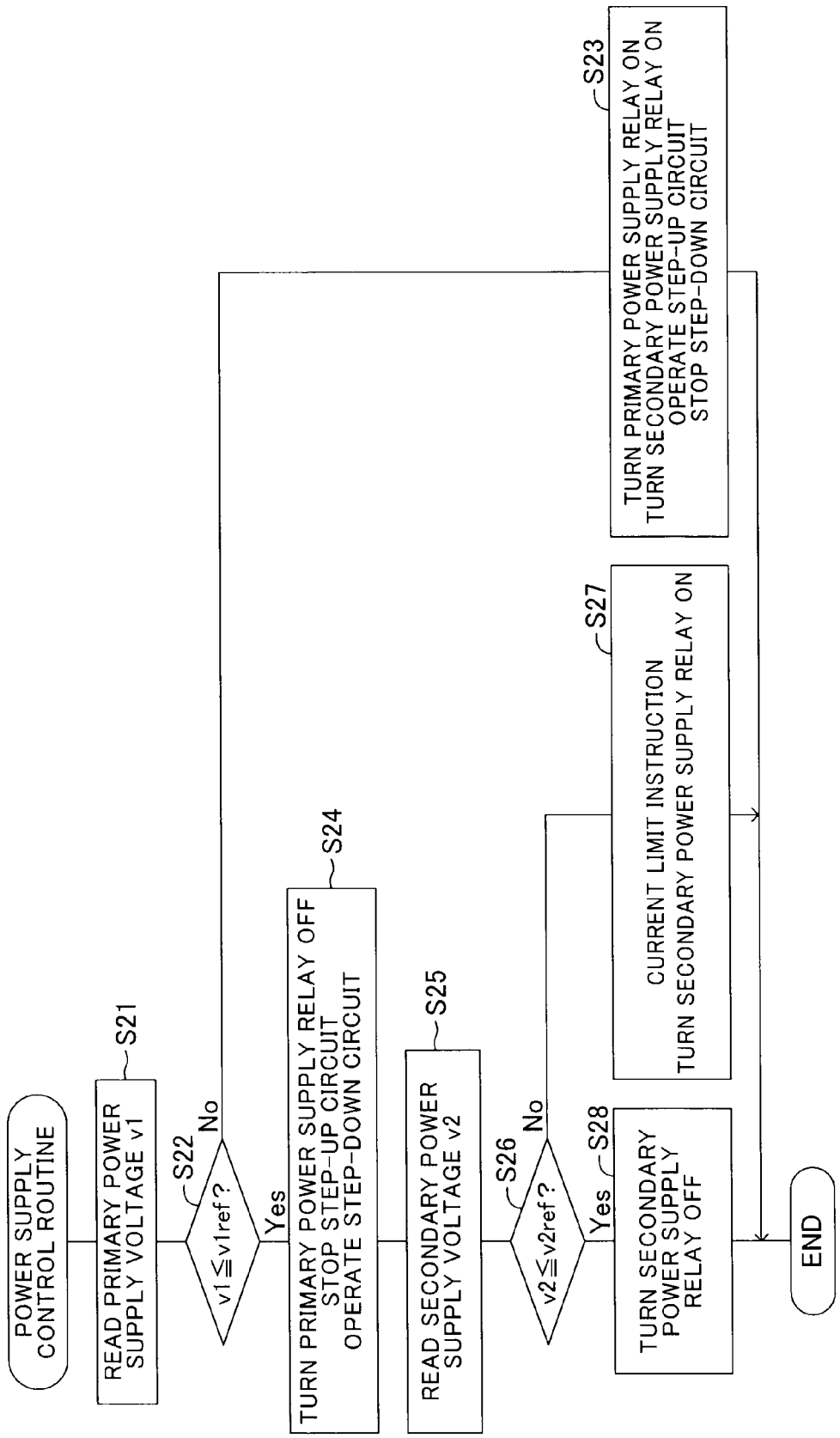
FIG. 4 is a flowchart showing a power supply control routine.

Such power supply control will now be described in detail. FIG. 4 shows a power supply control routine executed by the power supply control section 62. This power supply control routine is stored in the ROM of the electronic control apparatus 60 in the form of a control program. The power supply control routine is started when the ignition switch 106 is turned on, and is repeated at predetermined short intervals.

When the present power supply control routine is started, in step S21, the power supply control section 62 reads the primary power supply voltage v1 detected by the first voltage sensor 71. A correlation exists between the power supply capacity of the primary power supply apparatus 100 and the primary power supply voltage v1; that is, when the power supply capacity of the primary power supply apparatus 100 drops, the primary power supply voltage v1 also drops accordingly. In view of this correlation, in the present embodiment, the power supply capacity of the primary power supply apparatus 100 is estimated on the basis of the primary power supply voltage v1.

Subsequently, in step S22, the power supply control section 62 determines whether or not the primary power supply voltage v1 is equal to or lower than a primary power supply determination voltage v1ref. When the primary power supply voltage v1 is higher than the primary power supply determination voltage v1ref (S22: NO), the power supply control section 62 determines that the power supply capacity of the primary power supply apparatus 100 has not yet dropped, and performs the processing of step S23. In step S23, the power supply control section 62 sets a power supply environment suitable for ordinary steering assist control. That is, the power supply control section 62 turns on both the primary power supply relay 107 and the secondary power supply relay 51 so as to create a state in which electric power can be supplied to the motor drive circuit 30 from both the primary power supply apparatus 100 and the secondary power supply apparatus 50. Simultaneously, the power supply control section 62 outputs a PWM control signal to the step-up circuit 40 so as to step up the output voltage of the primary power supply apparatus 100 to a target stepped-up voltage. Further, the power supply control section 62 maintains the step-down switching element 82 in an off state, so that electric power is not supplied from the secondary power supply apparatus 50 to the electronic control apparatus 60.

The present control routine is repeated at predetermined intervals. Accordingly, during a period in which the primary power supply voltage v1 is higher than the primary power supply determination voltage v1ref, electric power is supplied from the primary power supply apparatus 100 to the motor drive circuit 30 with its voltage stepped-up by the step-up circuit 40. When the motor drive circuit 30 consumes a large amount of electric power, the output voltage of the step-up circuit 40 drops temporarily, and electric power is supplied from the secondary power supply apparatus 50 to the motor drive circuit 30 in order to make up for the shortage. Further, in a state where the motor drive circuit 30 consumes a small amount of electric power, a charge current flows from the step-up circuit 40 to the secondary power supply apparatus 50, whereby the secondary power supply apparatus 50 is charged.

In such power supply state, steering assist control can be performed properly, and assist torque is unlikely to become insufficient.

When the power supply capacity of the primary power supply apparatus 100 drops, the primary power supply voltage v1 drops accordingly. When the drop in the power supply capacity of the primary power supply apparatus 100 increases and the primary power supply voltage v1 becomes equal to or lower than the primary power supply determination voltage v1ref, the power supply control section 62 makes a "Yes" determination in step S22, and proceeds to step S24. Notably, the primary power supply determination voltage v1ref is set to a voltage higher than the lowest operation voltage at which operation of the electronic control apparatus 60 is guaranteed.

In step S24, the power supply control section 62 stops the issuance of the ON signal to the primary power supply relay 107 to thereby open the contact of the primary power supply relay 107. That is, the power supply control section 62 turns the primary power supply relay 107 off. Accordingly, the circuit for supplying electric power from the primary power supply apparatus 100 to the motor drive circuit 30 is cut off. Simultaneously, the power supply control section 62 stops the PWM control signal fed to the step-up circuit 40 so as to turn the step-up switching elements 43 and 44 off, to thereby stop the step-up operation. Further, the power supply control section 62 outputs a pulse signal to the step-down switching element 82 so as to operate the step-down circuit 80, to thereby supply electric power from the secondary power supply apparatus 50 to the electronic control apparatus 60. In this case, the power supply control section 62 adjusts the duty ratio of the step-down switching element 82 such that the secondary control voltage v3 detected by the third voltage sensor 73 becomes equal to a previously set voltage (proper power supply voltage to be supplied to the electronic control apparatus 60).

Subsequently, in step S25, the power supply control section 62 reads the secondary power supply voltage v2 detected by the second voltage sensor 71. A correlation exists between the power supply capacity of the secondary power supply apparatus 50 and the secondary power supply voltage v2; that is, when the power supply capacity of the secondary power supply apparatus 50 drops, the secondary power supply voltage v2 also drops accordingly. In view of this correlation, in the present embodiment, the power supply capacity of the secondary power supply apparatus 50 is estimated on the basis of the secondary power supply voltage v2.

Subsequently, in step S26, the power supply control section 62 determines whether or not the secondary power supply voltage v2 is equal to or lower than a secondary power supply determination voltage v2ref. When the secondary power supply voltage v2 is higher than the secondary power supply determination voltage v2ref (S26: NO), the power supply control section 62 determines that the power supply capacity of the secondary power supply apparatus 50 has not yet dropped, and performs the processing of step S27. In step S27, the power supply control section 62 sets a power supply environment for performing steering assist control with current limit (hereinafter referred to as the "current-limited steering assist control"). That is, the power supply control section 62 maintains the secondary power supply relay 51 in an on state so as to supply electric power to the motor drive circuit 30 from only the secondary power supply apparatus 50, and sets an upper limit representing the maximum current which can be supplied to the electric motor 20, in order to suppress a sharp drop in the power supply voltage of the secondary power supply apparatus 50.

Figure 5:
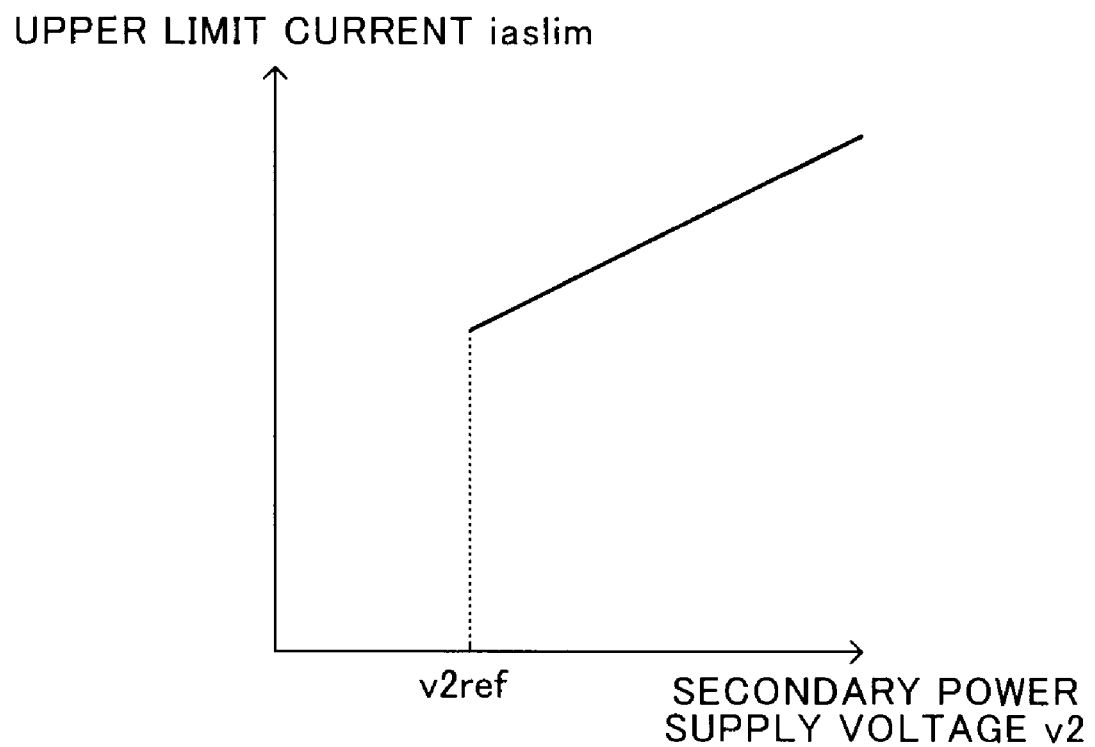
FIG. 5 is a graph showing change in upper limit current set in accordance with secondary power supply voltage.

When performing the processing of step S27, the power supply control section 62 sets an upper limit current iaslim corresponding to the secondary power supply voltage v2 as shown in FIG. 5, and outputs to the assist control section 61 a current limiting instruction for limiting the motor current to the upper limit current iaslim. When the assist control section 61 calculates the target current ias* in step S14 of the above-described steering assist control routine, the assist control section 61 calculates the target current ias* such that the current flowing through the electric motor 20 becomes equal to or less than the upper limit current iaslim.

Accordingly, it is possible to continue steering assist while suppressing the power consumption. Further, it is possible to suppress a sharp drop in the power supply voltage of the secondary power supply apparatus 50. Notably, in the present embodiment, a function or a reference table which determines the upper limit current iaslim such that the value of the upper limit current iaslim decreases with the secondary power supply voltage v2 is stored in the ROM, and the value of the upper limit current iaslim is obtained by use of the function or the reference table. However, the present embodiment may be configured such that the upper limit current iaslim is not changed, and is stored as a fixed value.

When the secondary power supply voltage v2 of the secondary power supply apparatus 50 becomes equal to or lower than the secondary power supply determination voltage v2ref during a period in which the current-limited steering assist control is being performed (S26: YES), the power supply control section 62 determines that the power supply capacity of the secondary power supply apparatus 50 has dropped, and proceeds to step S28. In step S28, the power supply control section 62 stops the issuance of the ON signal to the secondary power supply relay 51 to thereby open the contact of the secondary power supply relay 51. That is, the power supply control section 62 turns the secondary power supply relay 51 off. Accordingly, the circuit for supplying electric power from the secondary power supply apparatus 50 to the motor drive circuit 30 is cut off. In this case, since the step-down circuit 80 is operated, the supply of electric power from the secondary power supply apparatus 50 to the electronic control apparatus 60 is continued.

In the case where the power supply capacities (power supply voltages) of both the primary power supply apparatus 100 and the secondary power supply apparatus 50 have dropped, if the steering assist control is continued further, both the primary power supply voltage and the secondary power supply voltage may fall below the lowest operation voltage of the electronic control apparatus 60. In order to avoid such a possibility, the present embodiment is configured as follows. In such a situation, the circuit for supplying electric power from the secondary power supply apparatus 50 to the motor drive circuit 30 is cut off, and the electric power stored in the secondary power supply apparatus 50 is used for only the electronic control apparatus 60. That is, priority is given to the supply of electric power to the electronic control apparatus 60 over the supply of electric power to the motor drive circuit 30. Accordingly, the supply of electric power to the electronic control apparatus 60 is secured, whereby resetting of the microcomputer, which would otherwise occur due to a drop in the power supply voltage, can be prevented.

Since the present power supply control routine is repeated at predetermined short intervals, the power supply state within the electric power steering apparatus is switched in accordance with the power supply capacities (power supply voltages) of the primary power supply apparatus 100 and the secondary power supply apparatus 50 every time the power supply control routine is executed. Accordingly, for example, when the primary power supply voltage returns to the normal voltage in a state where both the power supply voltages of the primary power supply apparatus 100 and the secondary power supply apparatus 50 have dropped, ordinary steering assist control can be started. In this case, since resetting of the microcomputer of the electronic control apparatus 60 is prevented, the electronic control apparatus 60 can move to the ordinary steering assist control immediately without performing initial diagnosis processing, etc. After having returned to the ordinary steering assist control, the electronic control apparatus 60 can cause a charging current to flow from the step-up circuit 40 to the secondary power supply apparatus 50 when the power consumption of the motor drive circuit 30 is small, whereby the amount of electricity stored in the secondary power supply apparatus 50 can be increased.

According to the above-described electric power steering apparatus of the present embodiment, even when the primary power supply voltage of the primary power supply apparatus 100 drops, electric power can be supplied from the secondary power supply apparatus 50 to the electronic control apparatus 60. In addition, when the secondary power supply voltage has dropped, the supply of electric power from the secondary power supply apparatus 50 to the motor drive circuit 30 is stopped, and electric power is preferentially supplied to the electronic control apparatus 60. Therefore, more stable power supply can be maintained. As a result, a fault of the electronic control apparatus 60 (resetting of the microcomputer) can be prevented.

Further, since the respective power supply capacities are estimated on the basis of the power supply voltages of the primary power supply apparatus 100 and the secondary power supply apparatus 50, drops in the power supply capacities can be simply detected. In addition, since the fault of the electronic control apparatus 60 (resetting of the microcomputer) results from a drop in the supplied power supply voltage, occurrence of such a fault can be prevented reliably through detection of the voltage.

Further, since the primary power supply apparatus 100 and the secondary power supply apparatus 50 are used as power supply apparatuses for the electric power steering apparatus so as to fully draw out the steering assist performance, an increase in the capacity of the primary power supply apparatus 100 can be suppressed. Moreover, the step-up circuit 40 enables effective drive of the electric motor 20. In addition, since the power supply voltage of the secondary power supply apparatus 50 is supplied to the electronic control apparatus 60 after being stepped down by use of the step-down switching element 82, proper power supply can be performed.

In the above, an electric power steering apparatus has been described as an embodiment of the present invention. However, the present invention is not limited to the above-described embodiment, and may be modified in various manners without departing from the scope of the present invention.

For example, in the above-described embodiment, the supply of electric power from the secondary power supply apparatus 50 to the motor drive circuit 30 is stopped by means of turning the secondary power supply relay 51 off. However, the embodiment may be modified in such a manner that the flow of motor drive current is stopped by altering the PWM control signal fed to the motor drive circuit 30. In this case, the switching elements 31, 33, and 35 which form the upper arms of the three-phase inverter circuit and the switching elements 32, 34, and 36 which form the lower arms of the three-phase inverter circuit are turned on and off at a duty ratio of 50% and at high speed in such a manner that the state of the switching element in each upper arm is the reverse of the state of the switching element in the corresponding lower arm (one of the switching elements is in an on state, and the other switching element is in an off state).

Further, the present invention can be applied to other types of steering apparatuses which impart steering force to wheels, for example, a by-wire-type steering apparatus in which the steering wheel and steering shafts of wheels are mechanically separated from each other, and the wheels are steered only by a force produced by an electric motor which operates in accordance with a steering operation.

The invention claimed is:
1. A steering apparatus comprising:
a primary power supply apparatus;
a secondary power supply apparatus charged by the primary power supply apparatus;
an electric actuator which generates a steering force for steering wheels;
a drive circuit which receives electric power from a drive system power supply circuit formed by connecting the primary power supply apparatus and the secondary power supply apparatus in parallel and which drives the electric actuator;
an electronic control apparatus which receives electric power from a control system power supply circuit connected to the primary power supply apparatus and which outputs a control signal to the drive circuit so as to control operation of the electric actuator;
a secondary control system power supply circuit which is connected to the secondary power supply apparatus and the electronic control apparatus and supplies electric power from the secondary power supply apparatus to the electronic control apparatus;
power-supply-capacity-drop detection means for detecting a drop in the power supply capacity of the primary power supply apparatus and a drop in the power supply capacity of the secondary power supply apparatus; and power supply control means, operable when both a drop in the power supply capacity of the primary power supply apparatus and a drop in the power supply capacity of the secondary power supply apparatus are detected, for giving priority to the supply of electric power from the secondary power supply apparatus to the electronic control apparatus over the supply of electric power from the secondary power supply apparatus to the drive circuit.

2. A steering apparatus according to claim 1, wherein, when both a drop in the power supply capacity of the primary power supply apparatus and a drop in the power supply capacity of the secondary power supply apparatus are detected, the power supply control means prohibits the supply of electric power from the secondary power supply apparatus to the drive circuit, to thereby give priority to the supply of electric power from the secondary power supply apparatus to the electronic control apparatus.

3. A steering apparatus according to claim 2, wherein the power supply control means prohibits the supply of electric power from the secondary power supply apparatus to the drive circuit by cutting off a power supply circuit for supplying electric power from the secondary power supply apparatus to the drive circuit.

4. A steering apparatus according to claim 1, wherein the power-supply-capacity-drop detection means includes:
   primary-power-supply-voltage detection means for detecting a power supply voltage of the primary power supply apparatus; and
   secondary-power-supply-voltage detection means for detecting a power supply voltage of the secondary power supply apparatus,
   wherein the power-supply-capacity-drop detection means estimates that both the power supply capacities of the primary power supply apparatus and the secondary power supply apparatus have dropped, when the power supply voltage of the primary power supply apparatus becomes equal to or lower than a primary power supply determination voltage and the power supply voltage of the secondary power supply apparatus becomes equal to or lower than a secondary power supply determination voltage.

5. A steering apparatus according to claim 1, further comprising a step-up circuit which steps up an output voltage of the primary power supply apparatus, wherein the drive circuit is connected to the output side of the step-up circuit, and the secondary power supply apparatus is connected in parallel to a line between the step-up circuit and the drive circuit.

6. A steering apparatus according to claim 5, wherein a step-down circuit which steps down the power supply voltage of the secondary power supply apparatus is provided in the secondary control system power supply circuit which supplies electric power from the secondary power supply apparatus to the electronic control apparatus.

7. A steering apparatus comprising:
   a primary power supply apparatus;
   a secondary power supply apparatus charged by the primary power supply apparatus;
   an electric actuator which generates a steering force for steering wheels;
   a drive circuit which receives electric power from a drive system power supply circuit formed by connecting the primary power supply apparatus and the secondary power supply apparatus in parallel and which drives the electric actuator;
   an electronic control apparatus which receives electric power from a control system power supply circuit connected to the primary power supply apparatus and which outputs a control signal to the drive circuit so as to control operation of the electric actuator;
   a secondary control system power supply circuit which is connected to the secondary power supply apparatus and the electronic control apparatus and supplies electric power from the secondary power supply apparatus to the electronic control apparatus;
   a voltage detector configured to detect a drop in the power supply capacity of the primary power supply apparatus and a drop in the power supply capacity of the secondary power supply apparatus; and
   a power supply controller, operable when both a drop in the power supply capacity of the primary power supply apparatus and a drop in the power supply capacity of the secondary power supply apparatus are detected, configured to prioritize the supply of electric power from the secondary power supply apparatus to the electronic control apparatus over the supply of electric power from the secondary power supply apparatus to the drive circuit.

8. A steering apparatus according to claim 7, wherein, when both a drop in the power supply capacity of the primary power supply apparatus and a drop in the power supply capacity of the secondary power supply apparatus are detected, the power supply controller prohibits the supply of electric power from the secondary power supply apparatus to the drive circuit, to thereby give priority to the supply of electric power from the secondary power supply apparatus to the electronic control apparatus.

9. A steering apparatus according to claim 8, wherein the power supply controller prohibits the supply of electric power from the secondary power supply apparatus to the drive circuit by cutting off a power supply circuit for supplying electric power from the secondary power supply apparatus to the drive circuit.

10. A steering apparatus according to claim 7, wherein the voltage detector includes:
    a primary-power-supply-voltage detector configured to detect a power supply voltage of the primary power supply apparatus; and
    secondary-power-supply-voltage detector configured to detect a power supply voltage of the secondary power supply apparatus,
    wherein the voltage detector estimates that both the power supply capacities of the primary power supply apparatus and the secondary power supply apparatus have dropped, when the power supply voltage of the primary power supply apparatus becomes equal to or lower than a primary power supply determination voltage and the power supply voltage of the secondary power supply apparatus becomes equal to or lower than a secondary power supply determination voltage.

11. A steering apparatus according to claim 7, further comprising a step-up circuit which steps up an output voltage of the primary power supply apparatus, wherein the drive circuit is connected to the output side of the step-up circuit, and the secondary power supply apparatus is connected in parallel to a line between the step-up circuit and the drive circuit.

12. A steering apparatus according to claim 11, wherein a step-down circuit which steps down the power supply voltage of the secondary power supply apparatus is provided in the secondary control system power supply circuit which supplies electric power from the secondary power supply apparatus to the electronic control apparatus.

* * * * *